(12) United States Patent
Chi et al.

(10) Patent No.: US 11,205,817 B2
(45) Date of Patent: Dec. 21, 2021

(54) BATTERY PACK

(71) Applicant: LG Chem, Ltd., Seoul (KR)

(72) Inventors: Ho-June Chi, Daejeon (KR); Dal-Mo Kang, Daejeon (KR); Jin-Hak Kong, Yuseong-gu (KR); Jeong-O Mun, Daejeon (KR); Jin-Yong Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/348,034

(22) PCT Filed: Jan. 16, 2018

(86) PCT No.: PCT/KR2018/000754
§ 371 (c)(1),
(2) Date: May 7, 2019

(87) PCT Pub. No.: WO2018/236022
PCT Pub. Date: Dec. 27, 2018

(65) Prior Publication Data
US 2019/0305270 A1    Oct. 3, 2019

(30) Foreign Application Priority Data
Jun. 22, 2017    (KR) .................... 10-2017-0079276

(51) Int. Cl.
*H01M 50/20*    (2021.01)
(52) U.S. Cl.
CPC ........ *H01M 50/20* (2021.01); *H01M 2220/20* (2013.01)

(58) Field of Classification Search
CPC ... H01M 2/1077; H01M 2/10; H01M 2220/20
See application file for complete search history.

(56) References Cited

U.S. PATENT DOCUMENTS

| | | | |
|---|---|---|---|
| 2007/0134524 | A1 | 6/2007 | Cho et al. |
| 2011/0097614 | A1 | 4/2011 | Kim |
| 2013/0236751 | A1 | 9/2013 | Seong et al. |
| 2014/0030566 | A1 | 1/2014 | Lee |
| 2014/0120391 | A1 | 5/2014 | Park |

(Continued)

FOREIGN PATENT DOCUMENTS

| | | |
|---|---|---|
| CN | 204333167 U | 5/2015 |
| CN | 205248353 U | 5/2016 |

(Continued)

OTHER PUBLICATIONS

KR101531577B1_-_Apparatus_for_preventing_block_overturning_-_Google_Patents.pdf (Year: 2013).*

(Continued)

*Primary Examiner* — Sarah A. Slifka
*Assistant Examiner* — Patrick Marshall Greene
(74) *Attorney, Agent, or Firm* — Lerner, David, Littenberg, Krumholz & Mentlik, LLP

(57) ABSTRACT

Disclosed is a battery pack. The battery pack includes: a plurality of battery modules each having a plurality of battery cells therein; and a guide member coupled to each of the battery modules, the guide member being configured to guide movement of the battery modules when the plurality of battery modules are assembled adjacent to one another.

6 Claims, 8 Drawing Sheets

(56) References Cited

U.S. PATENT DOCUMENTS

| | | | | |
|---|---|---|---|---|
| 2015/0072199 A1* | 3/2015 | Schmidt | ............ | H01M 10/6567 429/90 |
| 2016/0308242 A1 | 10/2016 | Ju | | |

FOREIGN PATENT DOCUMENTS

| | | | | |
|---|---|---|---|---|
| CN | 106803559 | A | * | 6/2017 |
| JP | 2001313018 | A | | 11/2001 |
| JP | 2006286602 | A | | 10/2006 |
| JP | 2009266653 | A | * | 11/2009 |
| JP | 2013073918 | A | | 4/2013 |
| JP | 2014501021 | A | | 1/2014 |
| JP | 2016046179 | A | | 4/2016 |
| JP | 2016046207 | A | | 4/2016 |
| JP | 2016178085 | A | | 10/2016 |
| JP | 2016192335 | A | | 11/2016 |
| KR | 100726503 | B1 | | 6/2007 |
| KR | 20120055451 | A | | 5/2012 |
| KR | 20140015846 | A | | 2/2014 |
| KR | 20150007834 | A | | 1/2015 |
| KR | 101531577 | B1 | * | 6/2015 |
| KR | 20160123091 | A | | 10/2016 |
| KR | 101742980 | B1 | | 6/2017 |
| WO | 2016129473 | A1 | | 8/2016 |

OTHER PUBLICATIONS

International Search Report for PCT/KR2018/000754, dated Aug. 20, 2018.

Extended European Search Report including the Written Opinion for Application No. EP 18820574.4 dated Feb. 25, 2020, 6 pages.

Chinese Search Report for Application No. 201880004914.1 dated Jun. 3, 2021, pp. 1-3.

\* cited by examiner

BATTERY PACK

The present application is a national phase entry under 35 U.S.C. § 371 of International Patent Application No. PCT/KR2018/000754, filed on Jan. 16, 2018, published in Korean, which claims priority from Korean Patent Application No. 10-2017-0079276, filed on Jun. 22, 2017, the disclosures of which are hereby incorporated herein by reference.

TECHNICAL FIELD

The present disclosure relates to a battery pack, and more particularly, to a battery pack capable of having an improved rigidity while reducing overall volume and weight.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

FIG. 1 is a perspective view showing a conventional battery pack, FIG. 2 is a partial sectioned view of FIG. 1, observed from the above, and FIG. 3 is a partial sectioned view of another conventional battery pack, observed from the above.

Referring to FIGS. 1 and 2, the battery pack 1 includes a pack cover 2, a module cover 3 and an inner frame 4. In this case, rigidity is improved, but the battery pack 1 becomes larger and heavier since its weight increases and its volume relatively increases. Referring to FIG. 3, the battery pack 1 includes only the pack cover 2 and the inner frame 4, and the module cover 3 of FIG. 2 is removed. Thus, weight is reduced and the relative volume is reduced. However, the rigidity is also reduced not to sufficiently cope with an external impact, and thus a battery cell 6 accommodated in a battery module 5 is vulnerable to an external impact.

DISCLOSURE

Technical Problem

The present disclosure is designed to solve the problems of the related art, and therefore the present disclosure is directed to providing a battery pack which may have improved rigidity while reducing overall volume and weight.

In addition, the present disclosure is directed to providing a battery pack, which may allow battery modules provided in the battery pack to be assembled conveniently and easily.

Technical Solution

In one aspect of the present disclosure, there is provided a battery pack comprising: a plurality of battery modules each having a plurality of battery cells therein; and a guide member coupled to each of the battery modules, the guide member being configured to guide movement of the battery modules when the plurality of battery modules are assembled adjacent to one another.

Also, each of the battery modules may have an insert hole into which the guide member is inserted.

In addition, the guide member may be inserted through the insert hole of each of the plurality of battery modules so that the plurality of battery modules are arranged adjacent to each other.

Also, each of the battery modules may include an upper frame, a lower frame and a side frame surrounding the plurality of battery cells of the respective battery module, and the insert hole of each of the battery modules may be formed in the respective side frame.

In addition, the guide member may include a guide rail having a rod shape.

Also, the battery pack may further include a module fixing member coupled to an end of the guide member, the module fixing member being configured to fix a location of the battery modules relative to one another.

In addition, the guide member may have a length adjusting unit that is configured to be adjusted to change a length of the guide member.

Also, the length adjusting unit may have a telescoping structure.

In addition, the telescoping structure may include: a first moving portion having a first diameter; and a second moving portion having a second diameter greater than the first diameter, wherein at least part of the first moving portion extends within the second moving portion.

Meanwhile, in another aspect of the present disclosure, there is also provided a vehicle comprising the battery pack.

Advantageous Effects

According to the embodiments of the present disclosure, the rigidity may be improved while reducing overall volume and weight by means of the guide member.

In addition, since the battery modules provided in the battery pack are connected to each other by means of the guide member, the battery modules may be assembled conveniently and easily.

BEST MODE

Figure 1:
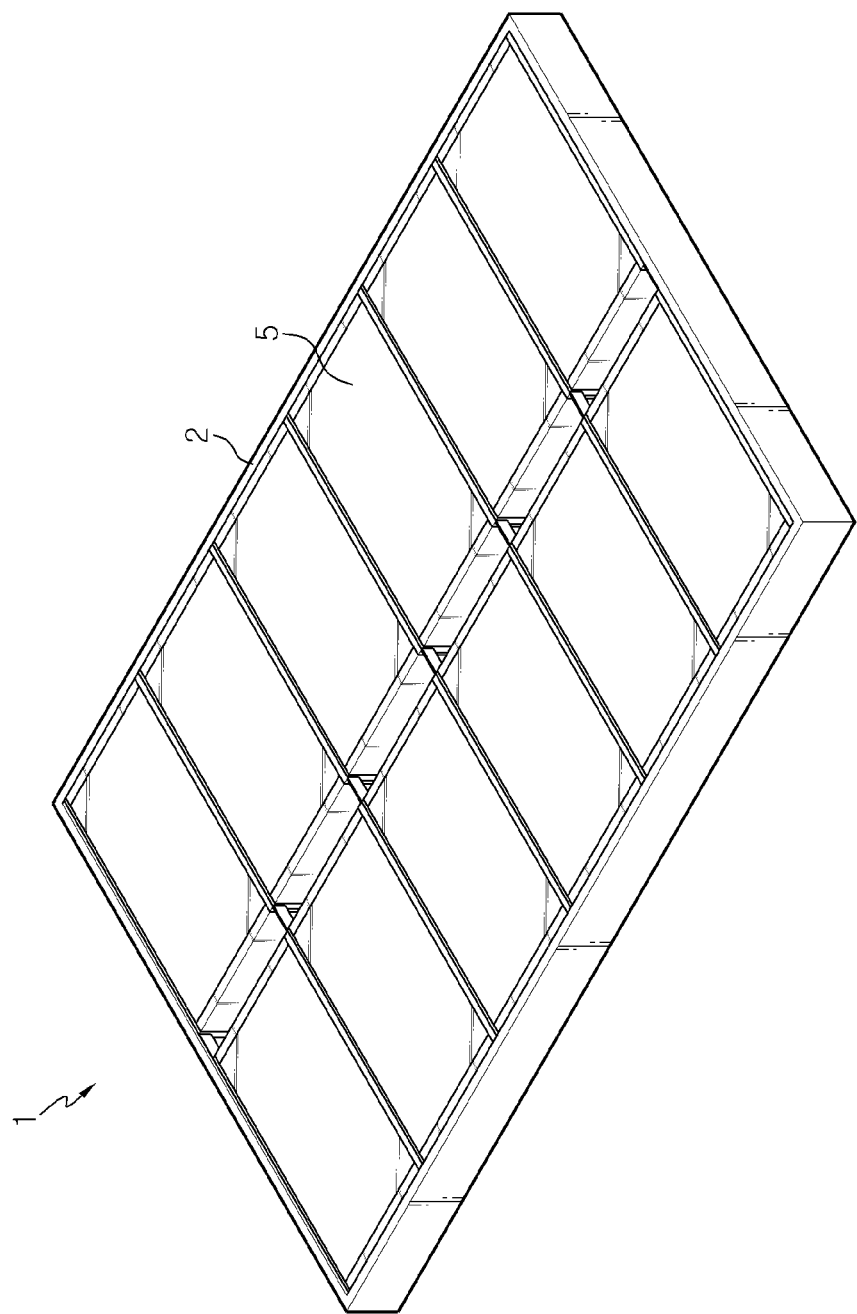
FIG. 1 is a perspective view showing a conventional battery pack.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 4:
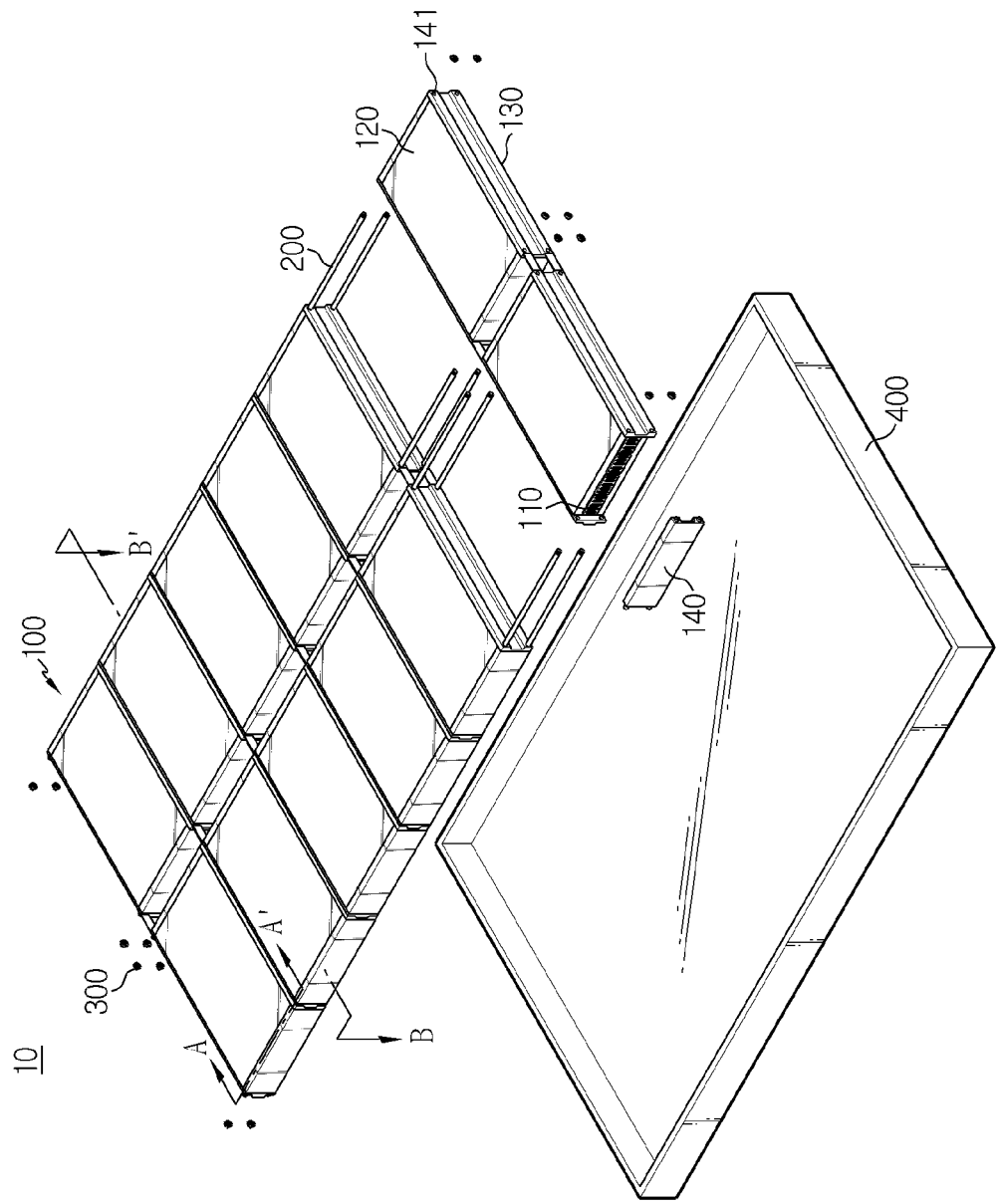
FIG. 4 is an exploded perspective view schematically showing the interior of a battery pack according to the first embodiment of the present disclosure.
Figure 5:
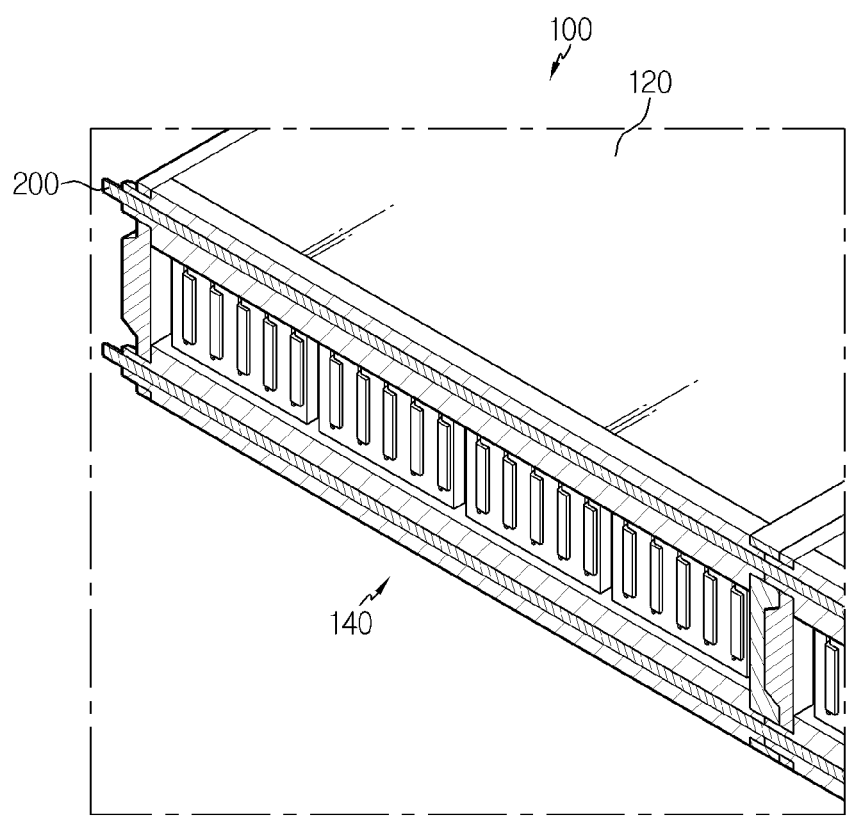
FIG. 5 is a cross-sectioned view, taken along the line A-A' of FIG. 4.
Figure 6:
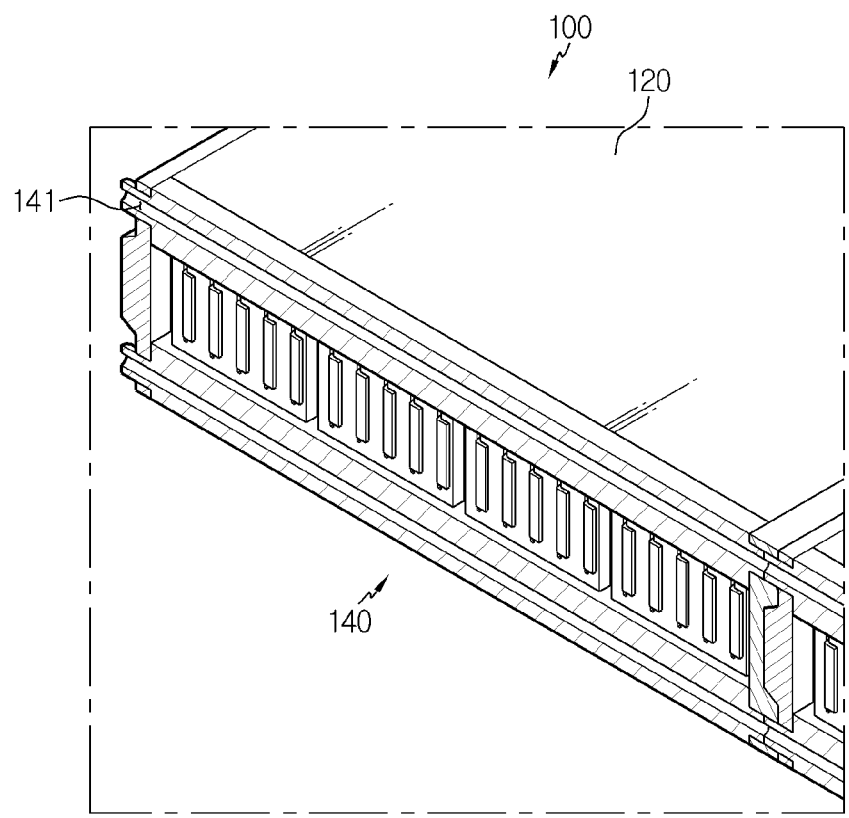
FIG. 6 is a cross-sectioned view where a guide member is removed from FIG. 5.
Figure 7:
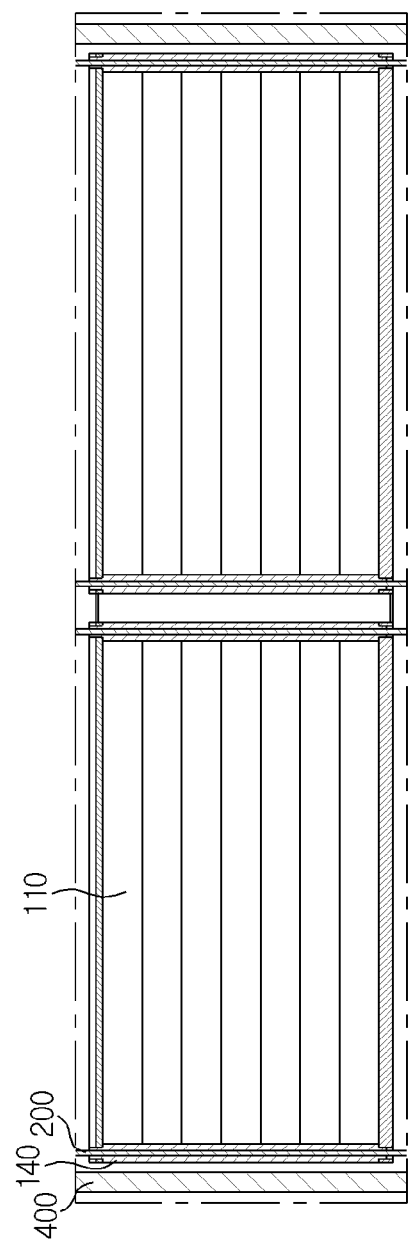
FIG. 7 is a cross-sectioned view, taken along the line B-B' of FIG. 4.

FIG. 4 is an exploded perspective view schematically showing the interior of a battery pack according to the first embodiment of the present disclosure, FIG. 5 is a cross-sectioned view, taken along the line A-A' of FIG. 4, FIG. 6 is a cross-sectioned view where a guide member is removed from FIG. 5, and FIG. 7 is a cross-sectioned view, taken along the line B-B' of FIG. 4.

Referring to FIGS. 4 to 7, a battery pack 10 according to the first embodiment of the present disclosure includes a battery module 100 and a guide member 200.

A plurality of battery modules 100 may be stacked or arranged in the battery pack 10. However, for convenience of description, the following explanation is based on the case where a plurality of battery modules 100 are provided in a single layer and arranged in a horizontal direction. The battery pack 10 may include an upper case (not shown) and a pack cover 400, and an upper case not shown in the figures may be coupled to the pack cover 400 to accommodate and protect the plurality of battery modules 100. The upper case and the pack cover 400 may accommodate one battery module 100 or a plurality of battery modules 100. That is, at least one battery module 100 is arranged in the upper case and the pack cover 400, and the upper case and the pack cover 400 surround and protect the battery module 100. That is, the upper case and the pack cover 400 surround the entire battery module 100, thereby protecting the battery module 100 from external vibration or impact. The upper case and the pack cover 400 may have a shape corresponding to the battery module 100. For example, when the entire shape of the battery modules 100 arranged in a single layer is a hexahedron shape, the upper case and the pack cover 400 may be provided in a hexahedron shape corresponding thereto. The upper case and the pack cover 400 may be prepared by, for example, bending a metal plate, and by doing so, the upper case and the pack cover 400 may be integrally formed. Here, if the upper case and the pack cover 400 are integrally manufactured, the bonding process may be performed conveniently and simply. Alternatively, the upper case and the pack cover 400 may be prepared separately and then coupled together in various ways such as welding, riveting, bolting, pin coupling, bracketing, moment bonding or the like. In addition, various devices for controlling charge and discharge of the battery modules 100, such as a BMS, a current sensor, a fuse, and the like may be included in the battery pack 10.

The battery module 100 may include a plurality of battery cells 110. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity. In addition, the battery cell 110 may have an electrode lead. The electrode lead is a type of terminals that are exposed to the outside and connected to an external device and may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. Meanwhile, the battery module 100 may include a plurality of cartridges for accommodating the battery cells 110. Each cartridge may be fabricated by injection-molding plastic, and a plurality of cartridges having an accommodation portion for accommodating the battery cell 110 may be stacked. A cartridge assembly in which a plurality of cartridges are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside.

The battery module 100 may have an insert hole 141 into which a guide member 200, explained later, may be inserted (see FIG. 6). That is, referring to FIGS. 4 and 5, the guide member 200 is inserted through the insert hole 141 formed in each of the plurality of battery modules 100, and the plurality of battery modules 100 may be arranged by means of the guide member 200. Since the plurality of battery modules 100 may be arranged in a predetermined pattern by simply inserting the guide member 200 into the insert hole 141, the battery modules 100 may be assembled conveniently and easily. That is, if the guide member 200 is inserted into the respective insertion holes 141 of the plurality of battery modules 100 in order, the battery modules 100 may be aligned in contact with each other. Here, the plurality of battery modules 100 may be coupled to each other.

The battery module 100 may be provided to surround the plurality of battery cells 110 in order to protect the plurality of the battery cells 110. For example, the battery module 100 may include an upper frame 120, a lower frame 130 and a side frame 140 surrounding the plurality of battery cells 110, and the upper frame 120, the lower frame 130 and the side frame 140 may be coupled to each other in an integrated form or in a detachable form. In addition, the insert hole 141 may be formed in the side frame 140. If the insert hole 141 is formed in the side frame 140, the battery modules 100 may be aligned based on the side frame 140. Here, the insert hole 141 may be formed in only one of the side frames 140, or the insert hole 141 may be formed in all of the side frames 140 at a portion where one side frame 140 is in contact with the other side frame 140. Alternatively, the insert hole 141 may be formed in both any one side frame 140 and the upper frame 120 at a portion where the side frame 140 is in contact with the upper frame 120, or may be formed in both any one side frame 140 and the lower frame 130 at a portion where the side frame 140 is in contact with the lower frame 130. That is, the insert hole 141 may be formed at any location as long as the guide member 200 is capable of being inserted along the side surfaces of the battery modules 100.

Referring to FIG. 4, the guide member 200 is coupled to the plurality of battery modules 100 and guides the movement of the battery modules 100. That is, the guide member 200 allows the plurality of battery modules 100 to be easily arranged.

The guide member 200 may have various shapes as long as it is capable of guiding the movement of the plurality of battery modules 100. For example, the guide member 200 may have a rod shape. Here, the rod-shaped guide member 200 may have various cross sections such as a triangular section, a square section or a circular section, but the cross section of the guide member 200 is not limited to these shapes. The guide member 200 may be provided as a rail, namely a guide rail, so that the battery modules 100 may move along the guide member 200. However, the guide member 200 need not necessarily be provided as a rail as long as it is capable of guiding the movement of the plurality of battery modules 100.

Figure 2:
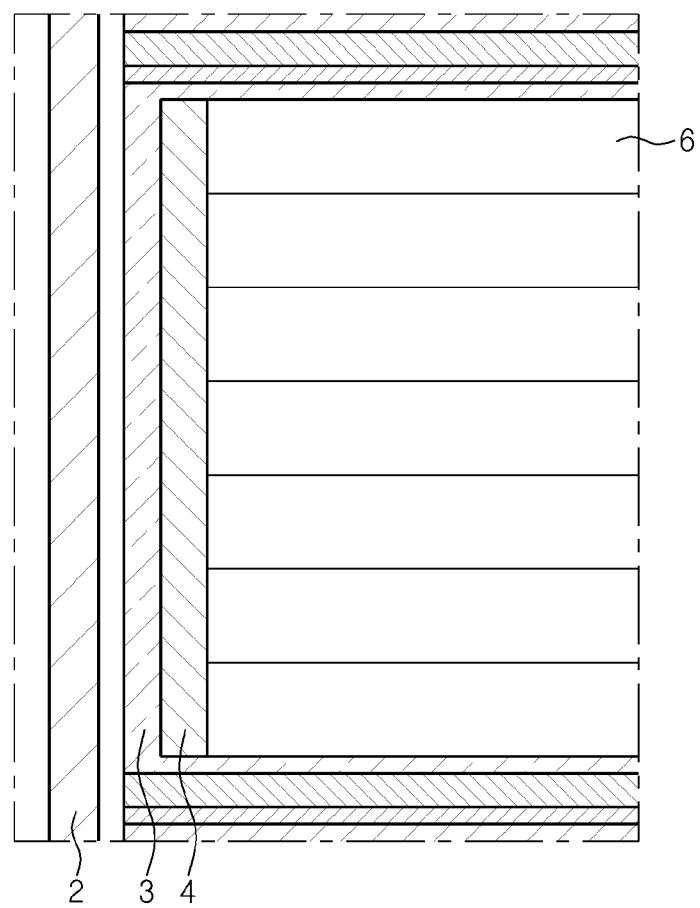
FIG. 2 is a partial sectioned view of FIG. 1, observed from the above.
Figure 3:
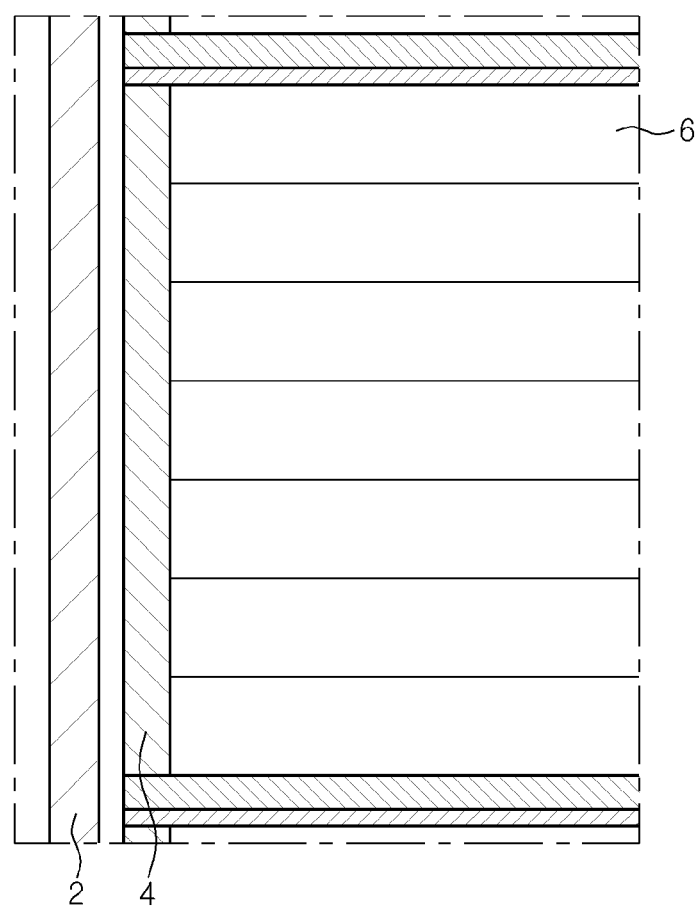
FIG. 3 is a partial sectioned view of another conventional battery pack, observed from the above.

The guide member 200 may have a length in a predetermined range so as to be coupled to the plurality of battery modules 100. In addition, the guide member 200 may be made of a material with predetermined rigidity so as to be coupled to the battery modules 100 and protect the battery modules 100 from external impacts. For example, the guide member 200 may be made of steel, but the material of the member 200 is not limited thereto. That is, if the guide member 200 is coupled to the insert hole 141 formed in the frame of each of the battery modules 100, the guide member 200 as well as the pack cover 400 and the frames 120, 130 and 140 protects the battery cells 110 from external impacts, thereby improving the rigidity of the entire battery pack 10. As described above, a conventional battery pack 1 includes all of the pack cover 2, the module cover 3 and the inner frame 4 (see FIG. 2), or includes only the pack cover 2 and the inner frame 4, except for the module cover 3 (See FIG. 3). In the former case, the battery pack 1 is large and heavy, and in the latter case, the rigidity of the battery pack 1 is weakened. However, referring to FIG. 7, seeing the battery pack 10 according to the first embodiment of the present disclosure, the weight and volume of the battery pack 10 are reduced since the configuration corresponding to the module cover 3 of the conventional art is removed, but the rigidity is increased since the guide member 200 is coupled to the battery modules 100. Thus, it is possible to sufficiently protect the battery cells 110 and implement a compact design of the battery pack 10, thereby solving the problems of both of the conventional battery packs 1.

A module fixing member 300 may be coupled to an end of the guide member 200 (see FIG. 4). If the end of the guide member 200 is open, the battery modules 100 may be deviated from the guide member 200 through the end portion of the guide member 200. In order to prevent this phenomenon, the battery fixing member 300 is coupled to the end portion of the battery module 100 to come into contact with the guide member 200, and thus it is possible to prevent the battery modules 100 from being deviated from the guide member 200. Here, the module fixing member 300 may have various materials and shapes to contact the battery module 100 and prevent detachment of the battery module 100, for example by using a nut or a block. That is, in the case where the module fixing member 300 is a nut, if the guide member 200 is inserted into all of the insert holes 141 of the plurality of battery modules 100, the nut is coupled to the end of the guide member 200 to contact the battery module 100, thereby fixing the battery modules 100 and preventing the battery modules 100 from moving.

Hereinafter, the operation and effect of the battery pack 10 according to the first embodiment of the present disclosure will be described.

The insert hole 141 is formed in each of the plurality of battery modules 100, and the guide member 200, for example a guide rail having a predetermined length, may be inserted into the insert hole 141 of each of the plurality of battery modules 100. Here, at least one guide rail may be provided and inserted into the side frame 140 of the battery module 100, and the battery modules 100 may be arranged in a predetermined pattern based on the side frames 140 of the battery modules 100.

As described above, the battery modules 100 may be easily aligned by inserting the guide rail into the insert holes 141 of the battery modules 100, thereby allowing the battery modules 100 to be assembled conveniently and easily. In addition, the guide member 200 as well as the pack cover 400 and the frames 120, 130, 140 of the battery module 100 protects the battery cells 110 from external impacts, thereby increasing the rigidity of the entire battery pack 10.

Figure 8:
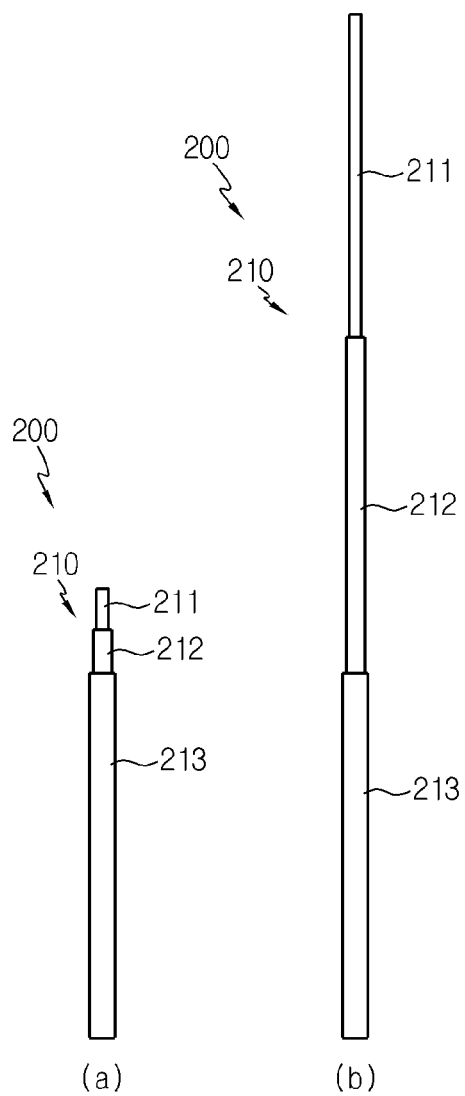
FIGS. 8(a) and 8(b) are diagrams for illustrating that the length of the guide member is adjusted in the battery pack according to the second embodiment of the present disclosure.

FIGS. 8(a) and 8(b) are diagrams for illustrating that the length of the guide member is adjusted in the battery pack according to the second embodiment of the present disclosure.

Hereinafter, the function and effect of a battery pack 10 according to the second embodiment according to the present disclosure will be described with reference to the drawings, but features common to the battery pack 10 according to the first embodiment of the present disclosure will not be described again in detail.

The second embodiment of the present disclosure is different from the first embodiment in the point that the guide member 200 has an adjustable length.

Referring to FIGS. 8(a) and 8(b), the guide member 200, for example the guide rail, may include a length adjusting unit 210 for adjusting a length thereof. Here, the length adjusting unit 210 may have a telescope structure. The telescope means a retracting telescope, and the telescope structure includes members with different diameters, where a member having a small diameter is inserted into a member having a large diameter and movable therein. The telescope structure may include a first moving portion 211 and a second moving portion 212. The first moving portion 211 may have any first diameter and the second moving portion 212 may have a second diameter greater than the first diameter so that the first moving portion 211 may be inserted therein. That is, the first moving portion 211 having a relatively small diameter may be inserted into the second moving portion 212 having a relatively large diameter and be moved in a sliding manner Here, the first moving portion 211 and the second moving portion 212 may have a predetermined rigidity and be made of plastic, metal, or various composite materials. In addition, if necessary, the length adjusting unit 210 may have a larger number of moving portions. For example, a third moving portion 213 having a third diameter greater than the second diameter may be provided, so that the second moving portion 212 having a relatively small diameter may be inserted into the third moving portion 213 having a relatively large diameter and be movable therein. However, the number of moving portions is not limited to the above, and the number of moving portions may be set variously as long as the length adjusting unit 210 has a telescopic structure.

Meanwhile, a vehicle (not shown) according to an embodiment of the present disclosure may include the battery pack 10 described above, and the battery pack 10 may include the battery module 100. In addition, the battery pack 10 according to the first or second embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery pack and is particularly applicable to industries associated with a secondary battery.

What is claimed is:

1. A battery pack comprising:
   a plurality of battery modules each having a plurality of battery cells therein, each battery module having a length in a first direction, a width in a second direction perpendicular to the first direction, and a height in a third direction perpendicular to the first and second directions, the height being smaller than the length and smaller than the width; and
   a guide member coupled to each of the battery modules, the guide member being configured to guide movement of the battery modules when the plurality of battery modules are assembled adjacent to one another, the guide member extending in the second direction parallel to the width,
   wherein each of the battery modules has an insert hole into which the guide member is inserted, each of the battery modules includes an upper frame, a lower frame and a side frame surrounding the plurality of battery cells of the respective battery module, and the insert hole of each of the battery modules is formed in the respective side frame, and
   wherein the guide member is a length adjusting unit that is configured to be adjusted to change a length of the guide member, and the length adjusting unit has a telescoping structure, the length adjusting unit extending across each of the plurality of battery modules.

2. The battery pack according to claim 1,
   wherein the guide member is inserted through the insert hole of each of the plurality of battery modules so that the plurality of battery modules are arranged adjacent to each other.

3. The battery pack according to claim 1,
   wherein the guide member includes a guide rail having a rod shape.

4. The battery pack according to claim 1, further comprising:
   a module fixing member coupled to an end of the guide member, the module fixing member being configured to fix a location of the battery modules relative to one another.

5. The battery pack according to claim 1, wherein the telescoping structure includes:
   a first moving portion having a first diameter; and
   a second moving portion having a second diameter greater than the first diameter, wherein at least part of the first moving portion extends within the second moving portion.

6. A vehicle comprising a battery pack according to claim 1.

* * * * *